United States Patent [19]

Sprauer

[11] 4,131,712

[45] Dec. 26, 1978

[54] PROCESS FOR PREPARING POLYAMIDE FROM DIACID-RICH COMPONENT AND DIAMINE-RICH COMPONENT

[75] Inventor: Jerome W. Sprauer, Wilmington, Del.

[73] Assignee: E. I. Du Pont de Nemours and Company, Wilmington, Del.

[21] Appl. No.: 823,326

[22] Filed: Aug. 10, 1977

[51] Int. Cl.² ............................................. C08G 69/28
[52] U.S. Cl. .................................................... 528/335
[58] Field of Search ...................................... 260/78 R

[56] References Cited

U.S. PATENT DOCUMENTS

| | | | |
|---|---|---|---|
| 3,884,881 | 5/1975 | Bice et al. | 260/78 R |
| 4,009,153 | 2/1977 | Shin | 260/78 R |

Primary Examiner—Harold D. Anderson

[57] ABSTRACT

A process for making a high molecular weight polyamide, wherein a diacid-rich component and a diamine-rich component are prepared separately in nonstoichiometric proportions, each of these components melting below the melting temperature of the polyamide product, and preferably below 200° C; and then the diacid-rich component and the diamine-rich component are contacted in liquid state at high enough temperature to prevent solidification, and in proportions such that the total amounts of diacid and diamine, whether combined or not, are as much as possible stoichiometric. A major utility of this process is in the production of Nylon 66, a known fiber-forming polyamide and engineering plastic.

13 Claims, 1 Drawing Figure

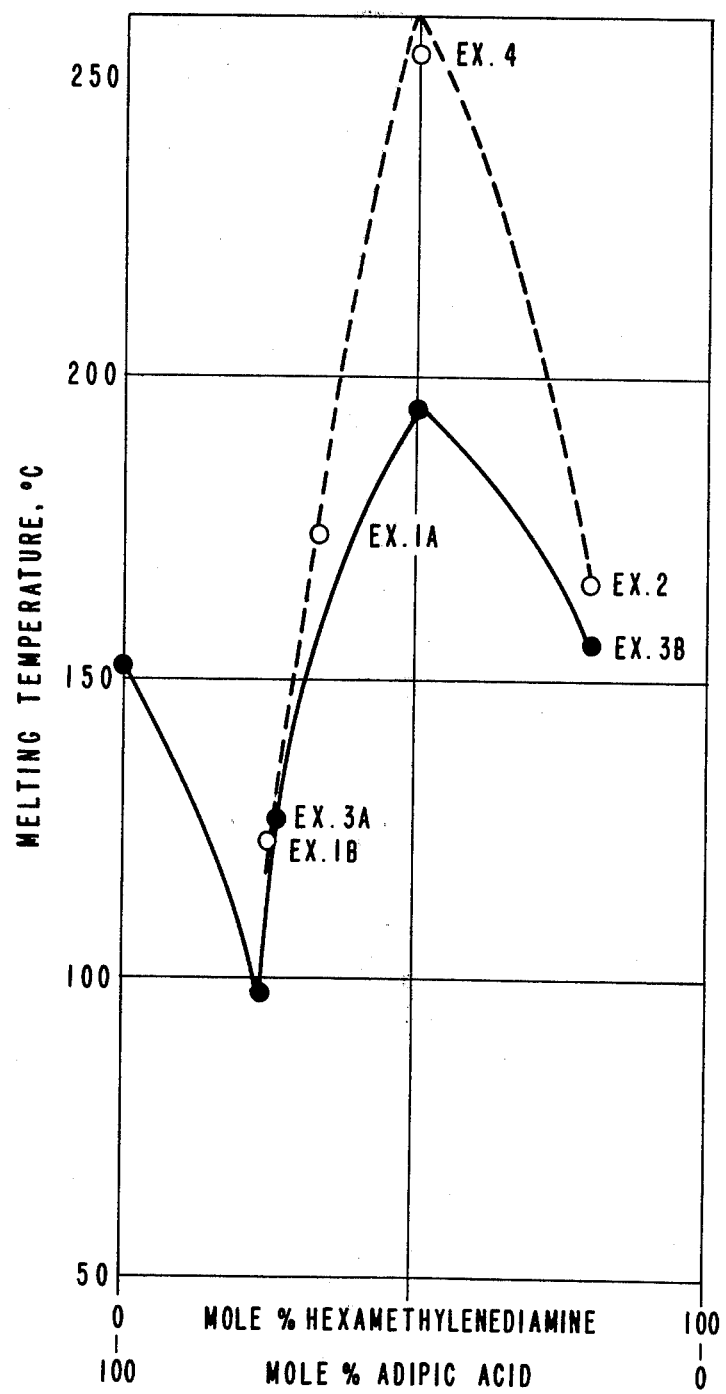

PROCESS FOR PREPARING POLYAMIDE FROM DIACID-RICH COMPONENT AND DIAMINE-RICH COMPONENT

BACKGROUND OF THE INVENTION

This invention relates to a process for preparing high molecular weight polyamides, which is carried out in liquid phase, and in the absence of organic solvents or of large amounts of water.

Prior art processes for preparing high molecular weight polyamides, whether starting with a dicarboxylic acid (also called diacid) and a diamine or a diester or a diacyl chloride and a diamine, usually were carried out in solution in an organic solvent or solvent mixture, water, or a solvent-water system. The most widely practiced industrial process starts with a dicarboxylic acid and a diamine, which are combined together in a stoichiometric ratio in solution in a large amount of water, that must eventually be evaporated and removed. The solids concentration in such a solution is normally only about 50%. It can be seen that these prior art processes require large amounts of energy and, in addition, call for large capital investment because of the size and complexity of equipment, which must handle large volumes of liquids per amount of polyamide produced.

Attempts were also made in the past to make high molecular weight polyamides in the absence of solvents, but such prior art techniques were troublesome because of the difficulty in efficiently mixing and heating a partially molten reacting mass to control the reaction temperature and thus prevent local overheating. Even when good temperature control was possible, some reactants suffered thermal degradation at the high temperatures required for maintaining and handling the feed streams in liquid state. Moreover, continuous operation was difficult because of lack of adequate techniques for continuously proportioning solid starting materials in exact quantities.

An ideal process for making high molecular weight polyamides should be carried out in the liquid state because of the ease of metering and conveying the reactants, in the absence of organic solvents or large amounts of added water, and at sufficiently low temperatures to avoid substantial thermal degradation.

SUMMARY OF THE INVENTION

According to this invention, it has now been discovered that high molecular weight polyamides can be conveniently prepared by a process comprising the following steps:

(1) providing a diacid-rich component prepared by melting together at least one dicarboxylic acid with at least one diamine or with a physical or chemical combination of at least one dicarboxylic acid with at least one diamine in a total diacid to total diamine mole ratio, whether free or chemically combined, of about 1.5:1 to 9:1;

(2) providing a diamine-rich component selected from at least one diamine and a product obtained by melting together at least one diamine with at least one dicarboxylic acid or with a physical or chemical combination of at least one diamine with at least one dicarboxylic acid in a total diamine to total dicarboxylic acid mole ratio, whether free or chemically combined, of at least 1.5:1;

(3) contacting in a melt the diacid-rich component with the diamine-rich component in such proportions that the mole ratio of the total diamine to the total dicarboxylic acid, whether free or chemically combined, is within the range of 0.95 to 1.05 and at sufficiently high temperature to prevent precipitation of solid material; and (4) heating together the molten components with good agitation to a sufficiently high temperature to cause polycondensation, with formation of a liquid high molecular weight polyamide;

with a proviso that each of dicarboxylic acid and diamine is a polymethylene compound having 6–12 carbon atoms.

BRIEF DESCRIPTION OF THE DRAWING

The drawing represents a plot of mixture melting temperatures for varying proportions of adipic acid and hexamethylenediamine.

DETAILED DESCRIPTION OF THE INVENTION

Depending on whether only one dicarboxylic acid and one diamine are used or more than one of each, the resulting polyamide will be either a simple polymer, such as poly(hexamethyleneadipamide) or a copolymer containing repeating units of varying lengths. The preferred dicarboxylic acid-diamine ratio in the diacid-rich component is at least about 3:1.

The diacid-rich component may be made, for example, by melting together the diacid with the diamine in a proper ratio, or with a physical mixture of the diacid with the diamine, or with a salt obtained from stoichiometric amounts of the diacid and the diamine (sometimes referred to in this disclosure as the nylon salt), or with an oligomer made by heating any physical or chemical combination of the diacid and the diamine at sufficiently high temperature to effect substantial dehydration, or with any combination of the above. The expression "chemical combination" means any chemical compounds or compositions obtained when a diacid and a diamine react with each other. The expression "physical combination" means a mixture or dispersion in each other but not a chemical compound or composition. If the diacid-rich component is made at a sufficiently low temperature, at which substantial dehydration is avoided, it will contain mainly salt compositions and excess of dicarboxylic acid; or if an oligomer is used, it also will be present. If the preparation is conducted at a high enough temperature, at which substantial dehydration occurs, a low-molecular weight, carboxyl-terminated polyamide (sometimes referred to in this disclosure as the carboxylic oligomer) will be obtained. A partial condensation product may also be present, for example, an oligomer terminated either at one end or at both ends by an amine-carboxylated salt function. Because of the proportions of diacid and diamine, excess of free dicarboxylic acid may be present in the acid-rich component, but in any case the acid-rich component has a relatively low melting point; for the preferred diacid-diamine ratio, below the melting point of the free acid. Depending on the specific starting materials used, it may be sometimes practical to mix together the diacid and the diamine or diacid-diamine combination in their final proportions desired for the diacid-rich component and melt the mixture with sufficient agitation. In other cases, it may be more practical to add gradually, continuously, or portionwise, the diamine or diacid-diamine combination to the dicarboxylic acid at a sufficiently high temperature to assure that any solids will promptly melt and/or dissolve.

Suitable dicarboxylic acids include adipic, pimelic, suberic, azelaic, sebacic, undecanedioic, and dodecanedioic. Suitable diamines include hexamethylenediamine, heptamethylenediamine, octamethylenediamine, nonamethylenediamine, decamethylenediamine, undecamethylenediamine, and dodecamethylenediamine. Adipic acid and hexamethylenediamine are the preferred starting materials. When they are used, the final high molecular weight polyamide is the well known Nylon 66. The proportions of the starting materials are preferably so adjusted that the acid-rich component melts below about 150° C.

Hexamethylenediamine is often sold commercially as an aqueous, rather than anhydrous, product, which contains about 10–15% water. While this aqueous product is suitable in the process of the present invention, anhydrous hexamethylenediamine and other anhydrous diamines and diacids are operable in the present process and are preferred. When the starting materials contain water, this water must be removed during the polyamide preparation, thus requiring additional energy input and causing additional expense. Anhydrous starting materials thus are more advantageous.

Referring now to the Drawing, molar proportions of adipic acid and hexamethylenediamine in their mixtures, as percent of the total mixture, are plotted as the abscissae and the melting temperatures of the mixtures as the ordinates in a plane Cartesian coordinate system. The graph contains two experimental curves, the solid curve representing low temperature operations, where substantial dehydration is avoided; and the broken line curve representing a high temperature operation, wherein substantial dehydration occurs and eventually leads to polyamide. Data points identified by "EX" followed by a number are based on the corresponding examples. It can be seen that a molar ratio of approximately 3 moles of the diacid to 1 mole of the diamine there is obtained a minimum melting temperature. As the diamine is added to the diacid, a eutectic depression is observed, without formation of intermediate, high melting acid salts. The nylon salt is formed when stoichiometric proportions of both components are present, and the melting temperature reaches a maximum. Continuing addition of hexamethylenediamine to the nylon salt causes a second eutectic depression of the melting temperature.

Similar diagrams can be constructed for other dicarboxylic acid-diamine pairs. The approximate minimum melting compositions and the melting points of mixtures of four dicarboxylic acids with hexamethylenediamine are given below:

| Diacid | Mole % Hexamethylenediamine | Melting Point |
| --- | --- | --- |
| adipic | 24 | 98 |
| azelaic | 15 | 97 |
| sebacic | 23 | 110 |
| dodecanoic | 26 | 107 |

It is understood that these determinations are subject to imprecision with respect to the temperature of complete melting and depend to some extent on the technique used. For example, one may melt, chill, and remelt a diamine-diacid mixture at progressively higher temperatures, until a clear liquid is obtained. One may also use differential thermal analysis. Both techniques were used, although not necessarily for all the data points. The temperatures shown have been averaged.

The diamine-rich component may be prepared in a similar manner to the diacid-rich component. It may contain free diamine in a mixture with nylon salt, a low molecular weight amine-terminated polyamide (amino oligomer), and/or amine salt-terminated carboxylic oligomer. It is often preferable to use the diamine alone as the diamine-rich component. The diamine-rich component will usually melt at moderate temperatures, often well below 150° C.

The relative proportions of the diamine-rich and diacid-rich components which are combined together in the final phase of the process of this invention should be as nearly as possible stoichiometric, taking into account the total amounts of dicarboxylic acid and diamine, whether bound or free. It is necessary to have equimolar amounts of diacid and diamine to obtain the highest molecular weight polyamide, say, about 20,000 number average or higher. The intermediate oligomers present in the diacid-rich and diamine-rich components will themselves normally have molecular weights below about 1,000 number average.

The preparation of high molecular weight polyamide from the diacid-rich and diamine-rich components merely requires heating these components together in proper proportions as a homogeneous, molten mass to a temperature at which polycondensation accompanied by water evolution takes place and maintaining the required temperature for a sufficient period to drive the polycondensation reaction substantially to completion. As the reaction progresses, the required temperature may have to be gradually increased to avoid solids separation. One of the advantages of the present invention is that it provides liquid feed streams since both the diacid-rich component and the diamine-rich component can be molten and metered into the reaction vessel. The polycondensation step can be carried out at atmospheric, superatmospheric, or subatmospheric pressure. Normally, atmospheric pressure will be quite satisfactory, but it may be occasionally advantageous to reduce the pressure to facilitate the removal of water from the reacting mass or to raise the pressure to avoid separation of solids. The preferred mole ratio of the diamine to the dicarboxylic acid, whether free or bound, in the total of acid-rich and amine-rich component is 0.97:1 to 1.03:1. Within this range, the highest molecular weight polyamide is obtained.

While many dicarboxylic acids are easily degraded when heated above their melting points, the free dicarboxylic acid that may be present in the diacid-rich component is not degraded under the process conditions of the present invention. This is due to the fact that the initial reaction temperatures are sufficiently low, so that overheating is avoided. For each diacid-diamine pair, the mole ratio of these starting materials can be so chosen that the diacid-rich component will melt below the melting point of the diacid alone. One skilled in the art can readily determine these ratios without undue experimentation by running at most a few simple tests.

This invention is now illustrated by the following examples of certain preferred embodiments thereof, where all parts, proportions, and percentages are by weight unless otherwise indicated.

EXAMPLE 1

Preparation of low melting acid-rich component

A.

One mole of adipic acid and one-half mole of hexamethylenediamine (containing 13.4% water) were mixed and cautiously melted in a glass laboratory resin kettle equipped with heater, stirrer, thermometer, nitrogen purge, and condensate receiver. When the free water (9.0 g) had distilled and the temperature reached 171° C., a homogeneous clear melt was attained. In order to form carboxylic oligomer, the melt was cautiously heated to 211° C. as water formed by dehydration of the components distilled, until distillation practically ceased. The product was chilled and solidified and tested by differential thermal analysis, showing multiple melting peaks of which the highest was 174° C.

B.

In a resin kettle, as in A above, 1.5 moles of adipic acid and 0.5 mole of anhydrous hexamethylenediamine were cautiously mixed and melted to a clear melt at about 180° C. Water was slowly distilled until distillation practically ceased; and the clear melt was chilled, solidified, and tested by differential thermal analysis, showing a single melting peak at 123° C.

The product was crushed and twice leached with boiling methanol. The methanol-insoluble fraction was tested by differential thermal analysis showing twin melting peaks at 167° and 179° C. This confirmed eutectic depression of oligomeric (methanol-insoluble) melting points by excess adipic acid (methanol-soluble, normal melting point 152° C.).

EXAMPLE 2

Preparation of low-melting amine-rich component

As in 1B above, 0.80 mole of anhydrous hexamethylenediamine, and 0.20 mole of adipic acid were mixed, melted and heated until distillation practically ceased at 215° C. The chilled solid product showed by differential thermal analysis a maximum melting peak at 166° C. The product was crushed and extracted with water and then with methanol. The methanol-insoluble fraction was tested by differential thermal analysis showing twin melting peaks at 197° and 210° C., confirming depression of oligomeric (methanol-insoluble) melting points by excess hexamethylenediamine (water- and methanol-soluble, normal melting point about 40° C.).

EXAMPLE 3

Mixtures of hexamethylenediammonium adipate with excess diacid or excess diamine

A.

Equal weights of adipic acid and purified hexamethylenediammonium adipate (a plant-run Nylon 66 intermediate) were intimately mixed and melted together by heating at a programmed rate in an encapsulated differential thermal analysis sample cup. First heating program was terminated at 155° C. The sample was cooled and remelted, showing melting peaks at 103° and 127° C. before melting program terminated at 195° C. This shows that eutectic depression of melting points occurs not only between adipic acid and oligomer but also between adipic acid and nylon salt.

B.

In the same way as in A above, one part by weight of hexamethylenediamine and 0.75 part by weight of hexamethylenediammonium adipate were intimately mixed and melted together by heating at a programmed rate in an encapsulated differential thermal analysis cup. First heating program was terminated at 175° C.; the sample was cooled and remelted showing peaks at 35° and 156° C. This experiment shows eutectic depression of melting points between hexamethylenediamine and nylon salt.

EXAMPLE 4

Preparation of high molecular weight polyamide

To a resin kettle as in Example 1A were charged 0.50 mole hexamethylenediamine, 0.02 mole acetic acid (to regulate molecular weight of the product), and 1.00 mole adipic acid. The charge was cautiously mixed and melted to a clear melt at 182° C. The temperature was slowly raised to 250° C. while simultaneously distilling water and adding further 0.25 mole of hexamethylenediamine. The temperature was gradually increased to 285° C., while simultaneously distilling water and adding the last 0.26 mole of hexamethylenediamine. The resulting clear melt was discharged and solidified, then tested by differential thermal analysis, showing a melting peak of 254° C. This example demonstrates the preparation of Nylon 66 with anhydrous feed materials at atmospheric pressure.

I claim:

1. A process for making a high molecular weight, fiber-forming polyamide, said process comprising the following steps:
   (1) providing a diacid-rich component prepared by melting together at least one dicarboxylic acid with at least one diamine or with a physical or chemical combination of at least one dicarboxylic acid with at least one diamine in a total diacid to total diamine mole ratio, whether free or chemically combined, of about 1.5:1 to 9:1;
   (2) providing a diamine-rich component selected from the group consisting of at least one diamine and a product obtained by melting together at least one diamine with at least one dicarboxylic acid or with a physical or chemical combination of at least one diamine with at least one dicarboxylic acid in a total diamine to total dicarboxylic acid mole ratio, whether free or chemically combined, of at least 1.5:1;
   (3) contacting in a melt the diacid-rich component with the diamine-rich component in such proportions that the mole ratio of the total diamine to the total dicarboxylic acid, whether free or chemically combined, is within the range of 0.95 to 1.05 and at sufficiently high temperature to prevent precipitation of solid material; and
   (4) heating together the molten components with good agitation to a sufficiently high temperature to cause polycondensation, with formation of a liquid high molecular weight polyamide;
   with a proviso that each of dicarboxylic acid and diamine is a polymethylene compound having 6–12 carbon atoms.

2. A process of claim 1 wherein the mole ratio of the diacid to the diamine, whether free or chemically combined, in the diacid-rich component is at least about 3:1.

3. A process of claim 1 wherein the dicarboxylic acid is adipic acid, and the diamine is hexamethylenediamine.

4. A process of claim 3 wherein the mole ratio of adipic acid to hexamethylenediamine, whether free or chemically combined, is about 3:1.

5. A process of claim 1 wherein the diacid-rich component consists essentially of a mixture of dicarboxylic acid with nylon-forming salt.

6. A process of claim 5 wherein the dicarboxylic acid is adipic acid, and the nylon-forming salt is hexamethylenediammonium adipate.

7. A process of claim 1 wherein the diacid-rich component consists essentially of a carboxylic oligomer.

8. A process of claim 7 wherein the oligomer is an oligomer of hexamethyleneadipamide.

9. A process of claim 1 wherein the diamine-rich component is a diamine.

10. A process of claim 9 wherein the diamine is hexamethylenediamine.

11. A process of claim 1 wherein the diamine-rich component is an amino-oligomer.

12. A process of claim 11 wherein the amino-oligomer is an oligomer of hexamethyleneadipamide.

13. A process of claim 1 wherein the diacid-rich component and the diamine-rich component are contacted in such proportions that the mole ratio of the total dicarboxylic acid to the total diamine, whether free or chemically combined, is within the range of 0.97 to 1.03.

* * * * *